United States Patent
Johnson et al.

(10) Patent No.: US 11,591,170 B2
(45) Date of Patent: Feb. 28, 2023

(54) ROBOTIC SYSTEMS AND METHODS FOR CONVEYANCE OF ITEMS

(71) Applicant: Dexai Robotics, Inc., Somerville, MA (US)

(72) Inventors: David M. S. Johnson, Cambridge, MA (US); Anthony Tayoun, Cambridge, MA (US); Robert Katzschmann, Cambridge, MA (US); Justin Rooney, New York, NY (US); Cody Chu, Somerville, MA (US); Luis Trueba, San Marcos, TX (US); John Harrington, Boston, MA (US); Jonah Palmer, Somerville, MA (US)

(73) Assignee: Dexai Robotics, Inc., Somerville, MA (US)

( * ) Notice: Subject to any disclaimer, the term of this patent is extended or adjusted under 35 U.S.C. 154(b) by 179 days.

(21) Appl. No.: 17/080,389

(22) Filed: Oct. 26, 2020

(65) Prior Publication Data

US 2021/0122585 A1 Apr. 29, 2021

Related U.S. Application Data

(60) Provisional application No. 62/926,288, filed on Oct. 25, 2019.

(51) Int. Cl.
*B65G 47/90* (2006.01)
*A47J 44/00* (2006.01)
*B65G 47/91* (2006.01)

(52) U.S. Cl.
CPC ............ *B65G 47/907* (2013.01); *A47J 44/00* (2013.01); *B65G 47/914* (2013.01); *B65G 2201/0235* (2013.01)

(58) Field of Classification Search
CPC ...... B25J 9/1682; B25J 9/0084; B25J 9/1669; B65G 47/907; B65G 47/914; B65G 2201/0235
See application file for complete search history.

(56) References Cited

U.S. PATENT DOCUMENTS

| 7,174,830 | B1* | 2/2007 | Dong | B25J 9/0087 99/348 |
| 2011/0280691 | A1* | 11/2011 | Yabe | H01L 21/67745 414/222.01 |
| 2013/0184866 | A1* | 7/2013 | Ota | B25J 9/162 700/250 |

(Continued)

FOREIGN PATENT DOCUMENTS

| WO | WO-2020/056301 A1 | 3/2020 |
| WO | WO-2020/056374 A1 | 3/2020 |

(Continued)

*Primary Examiner* — Gerald McClain
(74) *Attorney, Agent, or Firm* — Stephen J. Kenny; Vincenzo DiMonaco; Foley Hoag LLP

(57) ABSTRACT

A robotic system includes a hub assembly rotatable about a vertical axis. A robotic arm has a first end connected to the hub assembly and an opposite second end connected to an end effector, which is configured for holding an item. The system is configured to support an agent on or above the hub assembly for working on the item held by the end effector. The operation of the robotic arm and end effector to move the item does not obstruct operation of the agent.

24 Claims, 9 Drawing Sheets

(56) References Cited

U.S. PATENT DOCUMENTS

| | | |
|---|---|---|
| 2018/0015613 A1* | 1/2018 | Murakami ............. B25J 9/1682 |
| 2020/0086482 A1 | 3/2020 | Johnson et al. |
| 2020/0086485 A1 | 3/2020 | Johnson et al. |
| 2020/0086497 A1 | 3/2020 | Johnson et al. |
| 2020/0086498 A1 | 3/2020 | Johnson et al. |
| 2020/0086503 A1 | 3/2020 | Johnson et al. |
| 2020/0086509 A1 | 3/2020 | Johnson et al. |

FOREIGN PATENT DOCUMENTS

| | | |
|---|---|---|
| WO | WO-2020/056376 A1 | 3/2020 |
| WO | WO-2020/056377 A1 | 3/2020 |
| WO | WO-2020/056380 A1 | 3/2020 |

* cited by examiner

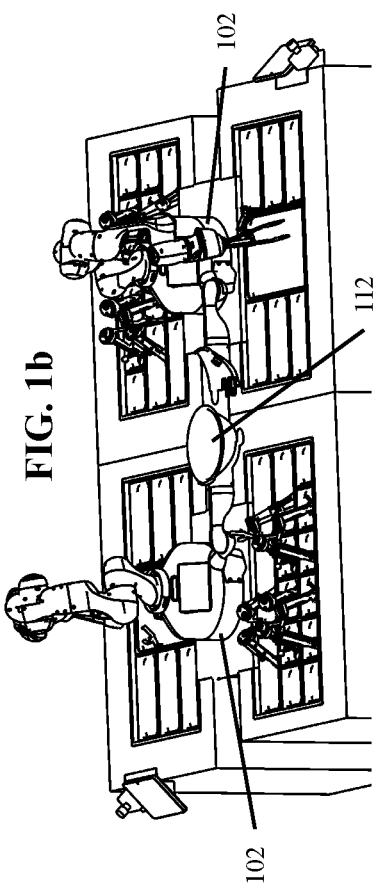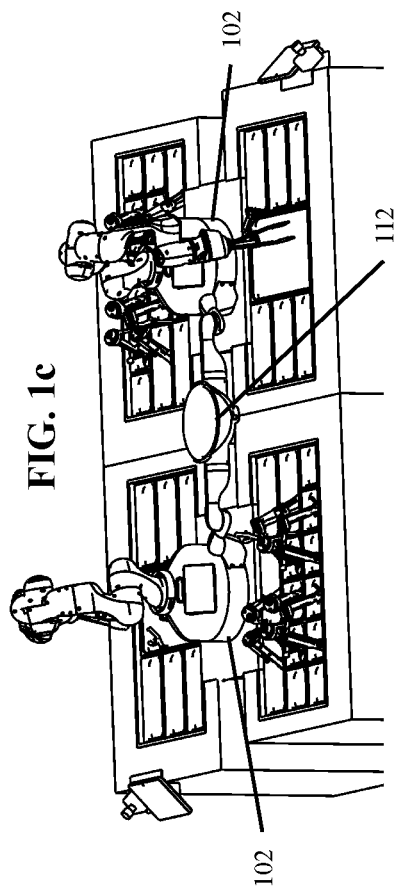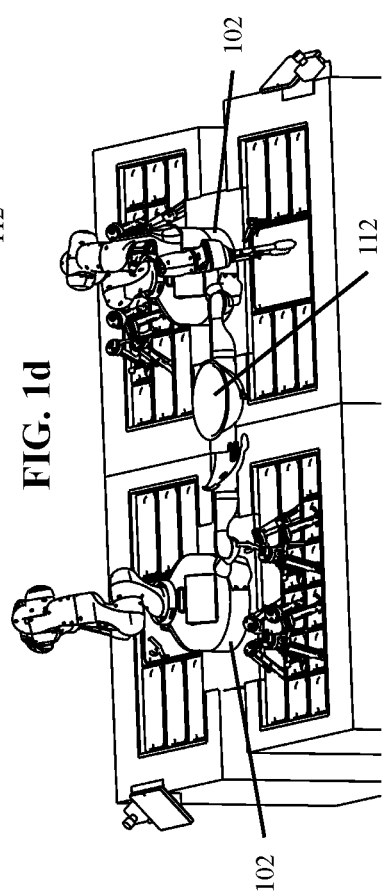

ROBOTIC SYSTEMS AND METHODS FOR CONVEYANCE OF ITEMS

CROSS REFERENCE TO RELATED APPLICATION

This application claims priority from U.S. Provisional Patent Application No. 62/926,288 filed on Oct. 25, 2019 entitled ROBOTIC SYSTEMS AND METHODS FOR CONVEYANCE OF ITEMS, which is hereby incorporated by reference.

BACKGROUND

The present application relates generally to robotic systems and, more particularly, to robotic systems performing work on an item in an assembly line.

In a commercial assembly line, an item (e.g., an object or a container for holding objects) is transported along a line while work is being done on the item (e.g., alteration of object(s) or container(s)), addition of object(s) to container (s), removal of object(s) from container(s)) by an external agent (e.g., a person or a robot). Existing solutions to automate this conveyance require physical space to place and operate the conveyance equipment (e.g., conveyors, robot arms), which can be expensive or otherwise prohibitive. For instance, many food industry premises (e.g., restaurants, canteen kitchens, retail salad makers, quick-service restaurants, catering service providers) transport foodstuff containers while being continuously filled with ingredients to make a desired recipe. Since restaurants typically have limited space, operators rely on humans to pass the containers from one station to the next.

Assembly line tasks typically require collaboration between several agents, which necessitates a way to pass items to different stations. When machines are the agents, they are often fixed in place, which requires a mechanism to transport the items. When humans are the agents, they can simply pass the bowl to their colleagues, or use a mechanism such as a conveyor belt. Existing mechanisms are generally unidirectional (or bidirectional) or require a large physical area. In many situations today, such as busy factory floors or food industry premises, reserving such a large area for conveying materials is inefficient and uneconomical. Passing items often poses a risk to humans.

Human workers can hurt themselves when manipulating items that are heavy or unwieldly. There is also risk to consumers, where the pick and place mechanism must be accurate and stable to not create any spillage, misplacement, cross-contamination, or assembly line failures. For example, during the assembly of food meals, food items should not fall into incorrect containers since they could be allergens affecting another customer's order.

In addition to conveyance, it may be advantageous to automate other aspects of the assembly line (such as alterations to the conveyed object) to boost the line's overall efficiency while maintaining a small physical footprint. For instance, in a food industry application, one agent may be assembling a recipe while another agent may be preparing ingredients for assembly (slicing an onion, peeling a carrot, etc.). In an automated warehouse instance, one agent could be filling boxes while the ancillary agent could close and seal these boxes.

Humans have limited measurement capabilities. Obtaining accurate data regarding the objects being manipulated by the agent is useful in various applications. For instance, in a food industry application, the container might be a serving bowl and objects being added to the container might be foodstuffs. To accurately and repeatably make a recipe, it is advantageous to have mass measurement capabilities to improve recipe consistency.

BRIEF SUMMARY OF THE DISCLOSURE

A robotic system in accordance with one or more embodiments includes a hub assembly rotatable about a vertical axis. The system also includes a robotic arm having a first end connected to the hub assembly and an opposite second end connected to an end effector, which is configured for holding an item. The system is configured to support an agent on or above the hub assembly for working on the item held by the end effector. The operation of the robotic arm and end effector to move the item does not obstruct operation of the agent.

A system in accordance with one or more further embodiments includes a plurality of robotic systems. Each of the robotic systems comprises: (a) a hub assembly rotatable about a vertical axis; (b) a robotic arm having a first end and an opposite second end, the first end being connected to the hub assembly; (c) an end effector connected to the second end of the robotic arm, the end effector configured for holding an item; and (d) a robotic agent on or above the hub assembly working on the item held by the robotic arm, wherein operation of the robotic arm to move the item does not obstruct operation of the robotic agent. The robotic systems are configured to convey the item from the end effector of one robotic system to the end effector of an adjacent robotic system to be worked on by the robotic agent of the adjacent robotic system.

A method of performing operations on an item in accordance with one or more further embodiments uses a plurality of robotic systems. Each of the robotic systems comprises: (i) a hub assembly rotatable about a vertical axis; (ii) a robotic arm having a first end and an opposite second end, the first end being connected to the hub assembly; (iii) an end effector connected to the second end of the robotic arm; and (iv) a robotic agent on or above the hub assembly, wherein operation of the robotic arm and end effector to move the item does not obstruct operation of the robotic agent. The method comprises the steps of: (a) holding the item using the end effector of a first one of the robotic systems;
(b) performing an operation on the item using the robotic agent of the first one of the robotic systems or the robotic agent of an adjacent second one of the robotic systems while the item is being held by the end effector of the first one of the robotic systems; (c) conveying the item using the robotic arm of the first one of the robotic systems to the end effector of the second one of the robotic systems; and (d) performing another operation on the item using the robotic agent of the second one of the robotic systems or the robotic agent of the first one of the robotic systems while the item is being held by the end effector of the second one of the robotic systems.

BRIEF DESCRIPTION OF THE DRAWINGS

FIGS. 1b-1d show operation of the robotic foodservice assembly line in passing a foodstuffs container down the line.

DETAILED DESCRIPTION

Figure 1A:
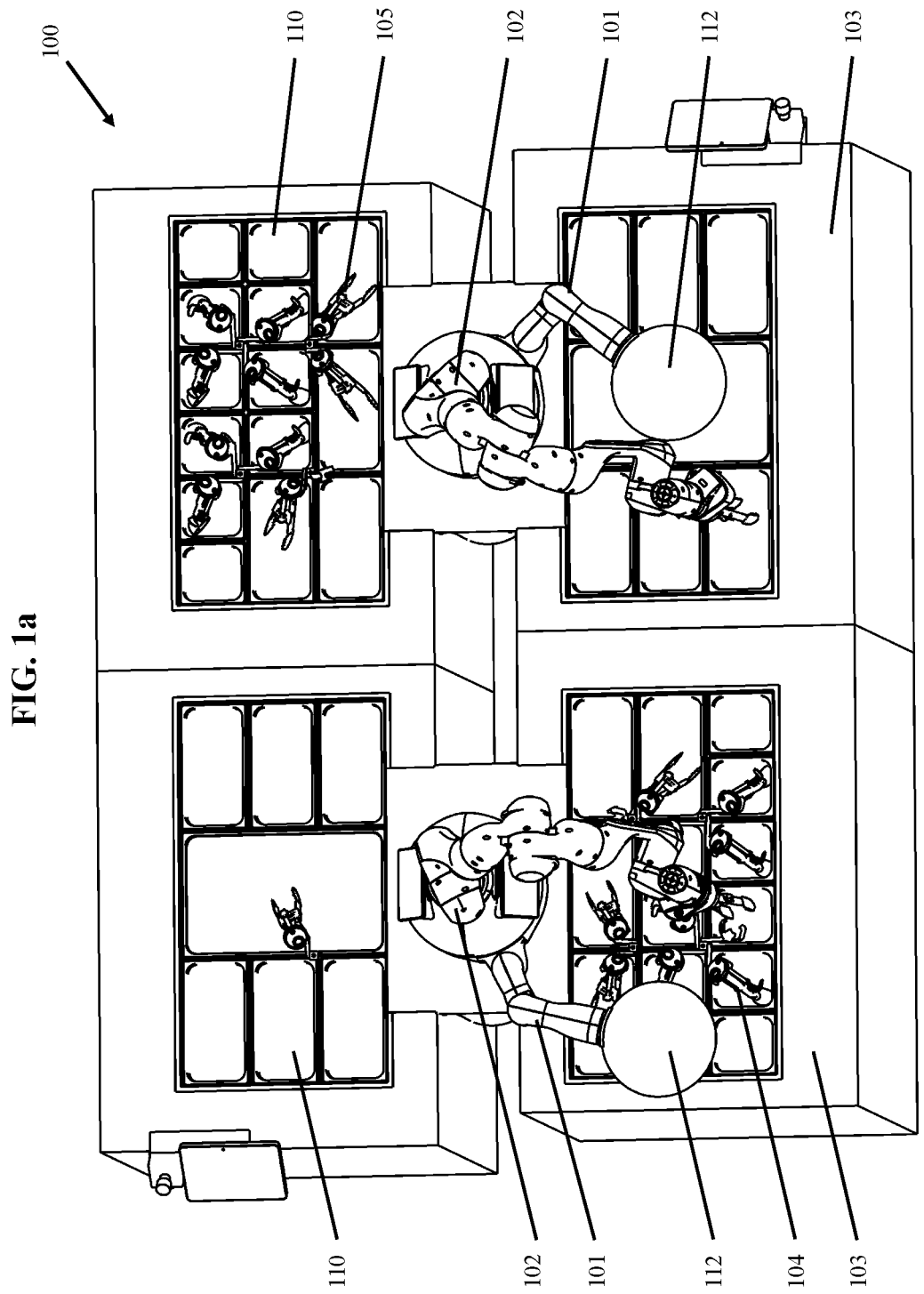
FIG. 1a shows a robotic foodservice assembly line having two exemplary robotic systems in accordance with one or more embodiments.

Various embodiments disclosed herein relate to robotic systems for working on items and conveying the items among stations, e.g., in a commercial assembly line.

A robotic system in accordance with one or more embodiments includes an ancillary robotic arm for holding and conveying items among stations without interfering with movement of an agent (e.g., a person or another robot) working on an item. Such systems enable efficient use of physical space in an assembly line. Additionally, such systems can increase throughput by creating efficiencies in a collaborative process since less operator time is spent passing items. Moreover, such systems can alleviate human operators from health risks stemming from handling heavy or otherwise hazardous materials. Furthermore, such systems can reduce spillage and cross-contamination risks, particularly in areas such as the food industry, by having the ancillary robotic arm simply shadow the agent during operation. This can be significantly beneficial especially for people with allergies. In addition to the simple conveyance of items, the ancillary robotic arm may conduct other useful tasks to boost the overall efficiency of the robotic arm and agent pair. For example, the ancillary robotic arm and agent can cooperate to enable the agent to perform two-handed operations. For example, the robotic arm can hold a foodstuff item, allowing the agent to perform operations such as slicing, more efficiently. In addition, the ancillary robotic arm can provide accurate sensing and measurement capabilities to improve the task outcome quality. For instance, the ancillary robotic arm can include a weight sensor for measuring the weight of an item being held, or a temperature sensor to measure how thoroughly cooked a food item is.

In the particular illustrative embodiments disclosed herein, the ancillary robotic arm system is depicted as applied to the foodservice industry. It should be understood, however, that the system is not limited for use in this particular environment. The systems can also be used in other environments such as, e.g., a delivery center of a warehouse floor to assist in inventory management or pick and place tasks. A larger version of the ancillary arm could convey tall columns of items to an agent who is standing on the platform to pick an item for packing. This solution could be an alternative to the mobile robots that are abundant on factory floors today.

An additional use case includes an assembly line which has tasks with variable durations. Variability in task time results in a shifting bottleneck, which makes process optimization difficult. Furthermore, in situations where tasks do not need to be done in a certain order, rearranging the order of tasks based on the actual measured speed of task completion can solve the issue of shifting bottlenecks. As such, a highly flexible assembly, such as the ancillary arm, is a suitable solution for optimizing assembly lines that feature tasks of variable duration. A multitude of appendages can be added to the system with any number of degrees of freedom and with any desired end effector on each appendage (see, e.g., FIGS. 5a, 5b, 6a, and 6b). This added flexibility enables the ancillary arm to adapt to troublesome areas by either avoiding the bottleneck entirely or providing additional resources to reduce the bottleneck.

An ancillary robotic arm with at least one degree of freedom is packaged beneath a platform supporting an external agent, which could be a robotic arm or a human operator. The ancillary robotic arm does not obstruct the movement of the external agent. The ancillary robotic arm passes items in any direction in space, such that all needed items or operations can be performed without movement from the agent. The ancillary robotic arm moves the item to a position in close proximity to the position from which the next action is performed. For example, in a recipe assembly process, the ancillary arm would move the food container to a position in proximity of the target ingredient to be placed in the container. This facilitates efficient actions performed by the agent, while also reducing errors and spillage or waste.

By placing the ancillary arm underneath a raised platform, one can leave enough space for an external agent to stand on that platform and perform any action without any obstruction. Further, by having one or more degrees of freedom, the ancillary arm can convey items in any direction while also rearranging the order of items to be conveyed. Suitably placed, these platforms and ancillary arms can efficiently convey items to the majority of a given area, without substantially reducing the available real estate.

The first degree of freedom in the ancillary arm is fully revolute allowing efficient movement to any needed area in the workspace while not obstructing the movement of either the arm or the external agent. Any additional added degrees of freedom can be added onto the first link to make a multiple degree of freedom system for more complex motions and flexibility. The robot shown in accompanying illustrations has two degrees of freedom. The added joints are sealed allowing the arm to be fully waterproof and insulated, giving the ability to operate in environments such as foodservice. Component designs or materials can be altered to make the system conducive to other harsh environments, such as temperature resistance for operating an over or fryer.

The helping hand component or end effector is positioned at the far end of the ancillary arm and allows the arm to manipulate or move items. In one example, the helping hand includes a vacuum cup, a bottom surface support, and two side supports. Upon activation of the vacuum cup, containers are compliantly pulled into a consistent secure position. Other known holding mechanisms can be also used, depending on the size and shape of the item to be conveyed.

FIG. 1a illustrates an exemplary robotic foodservice assembly line 100 having two robotic systems operating together to pick and place ingredients from bins 110 into containers 112. The commercial foodservice environment shown in FIG. 1a has a hotel pan style layout in a refrigerated table 103; this layout is common in the majority of quick-serve restaurants.

Each robotic system includes an ancillary robot arm 101 and a supplying robot arm 102. The supplying robot arm 102 is supported on or above the ancillary robot arm 101. The ancillary robot arm 101 holds a container 112 while it is filled with ingredients by the supplying robot arm 102. The ancillary robot arm 101 also conveys the container to the other ancillary robot arm 101.

In this embodiment, the ancillary arm 101 has two degrees of freedom (DOF) and is mounted beneath the supplying robot arm 102. The supplying robot arm 102 can be a commercial off-the-shelf (COT) industrial robot arm. In an alternative embodiment, the functions of the supplying robot arm 102 are performed by a human operator. By way of example, the supplying robotic arm 102 is a seven DOF Franka Emika robot, but generally any available industrial robot could be used. Alternatively, a human operator could stand on top of the ancillary arm 101 in place of the robot arm 102. In this situation, the ancillary arm 101 could advantageously move containers with contents that are too heavy or unwieldy or dangerous for the human to move alone, but the human could potentially do higher level manipulation tasks to add or modify components to the container.

FIG. 1a shows a birds-eye view of the ancillary arm 101 and the supplying robotic arm 102 picking an ingredient from a hotel pan and placing it in a container 112. The two DOF version of the ancillary arm 101 allows complete real-time shadowing of the supplying robotic arm 102 throughout the workspace of four full-sized hotel pans per supplying robotic arm. The ancillary arm 101 places the foodstuff container 112 as close as possible adjacent to the target bin. This is advantageous to reduce the distance and time to pick and place an ingredient into the bowl. Moreover, this design reduces spillage of ingredients back into the workspace, thereby reducing the chance of cross-contamination and waste.

The supplying robotic arm 102 picks ingredients from bins 110 using end effectors such as dishers 104 and tongs 105. Each bin 110 can have its own end effector suitable for picking the ingredient in that bin. The robotic arm 102 is configured to automatically swap end effectors as it operates to pick an ingredient from a different bin. U.S. Patent Application Publication No. 2020/0086503, which is incorporated by reference herein, discloses an exemplary tool switching mechanism that allows a robot arm to automatically swap end effectors for picking different food ingredients.

FIGS. 1b, 1c, and 1d show the process of passing a container 112 down the robotic foodservice line 100. In FIG. 1b the upstream ancillary arm 101 holds the container 112 through use of a vacuum cup (shown in FIGS. 5a and 5b) that can be switched on or off. The upstream ancillary arm 101 approaches the downstream ancillary arm 101. FIG. 1c shows the two ancillary arms 101 mated around a single foodstuffs container 112. The upstream ancillary arm 101 shuts off vacuum while the downstream arm 101 turns on vacuum. The downstream arm 101 then rigidly holds the container 112 in place and moves away from the upstream arm 101 as shown in FIG. 1d.

Figure 2A:
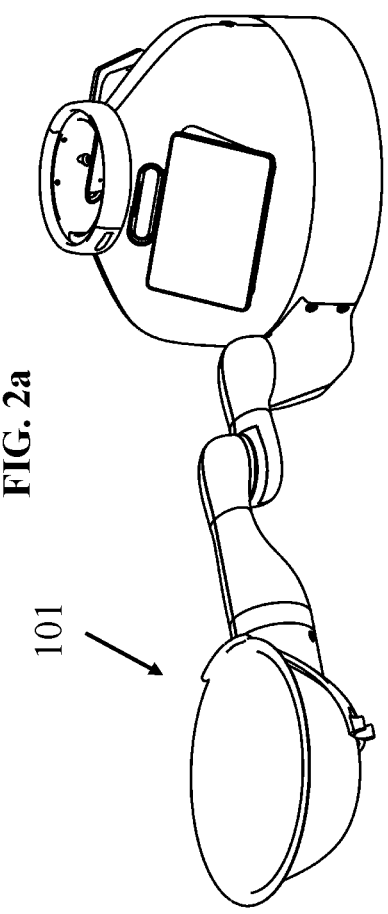
FIGS. 2a and 2b show an exemplary conveyance robot in accordance with one or more embodiments.

FIG. 2a shows the ancillary arm assembly 101 isolated. The design is modular in that the supplying robot 102 can be mounted with or without the ancillary arm 101 attached. Any similarly sized COTs robot arm could be adapted to the ancillary arm through a change in mounting hole pattern.

Figure 2B:
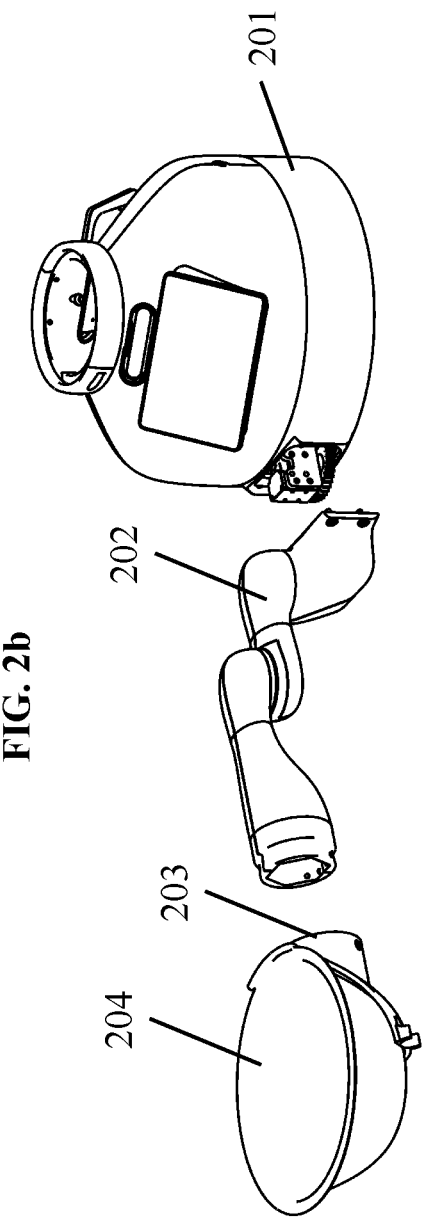

FIG. 2b shows the assembly 101 broken out into three distinct subsystems. Subsystem 201 is the joint zero(J0) hub, which enables coaxial movement of the ancillary arm without interference with the supplying robotic arm 102. Subsystem 202 is the modular intermediate arm, which contains an additional joint and positions the foodstuffs container at an appropriate distance from the supplying robotic arm 102. The design of 202 has one joint as shown, but any number of joints could be added to subsystem 202 with any link length. Subsystem 203 is called the helping hand, which is an end effector for rigidly holding foodstuff containers, e.g., a bowl 204. The container 204 is shown as a stainless steel mixing bowl that would be used to prepare a salad. The container 204 could conceivably be replaced with a variety of other containers such as a plastic bowl, cardboard box, cutting board, cup, etc. In the case of foodservice, all subsystems have sealed, easily cleanable surfaces and are made of non-toxic materials to comply with sanitary regulations.

Figure 3:
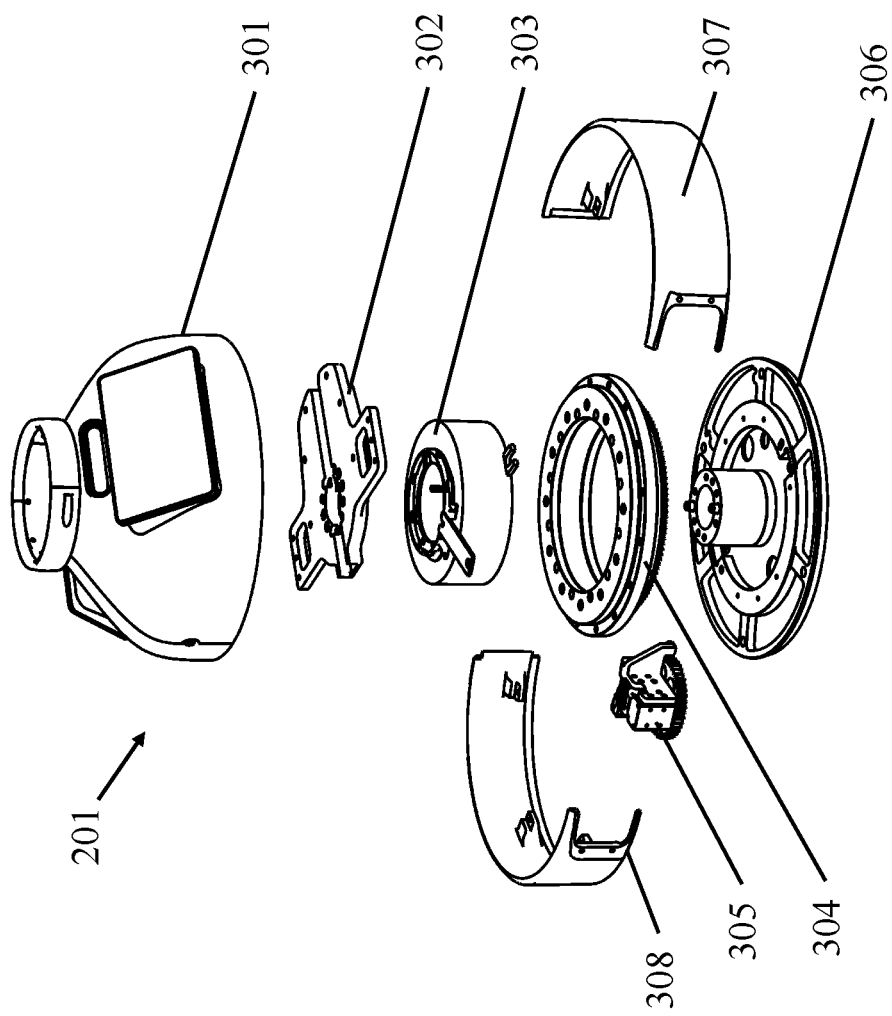
FIG. 3 shows an exemplary hub assembly of the conveyance robot in accordance with one or more embodiments

FIG. 3 details the components of subsystem 201. The design contains a rotor section which rotates about a vertical axis and is mated to the intermediate arm 202 and helping hand 203. The stator section of the design does not move and is mounted rigidly to a piece of kitchen equipment. The base structure 306 is part of the stator section and contains mating features to accept the slewing ring 304 above and mount to kitchen equipment below. The mating features on the interface below can be easily changed to function with other pieces of assembly line equipment. The slewing ring 304 has a stator section that includes a driven gear and a rotor section which moves with the joint zero (J0) motor assembly 305. The slewing ring is a bearing and provides dynamic structural support for the cantilever loads imparted by the intermediate arm 202, helping hand 203, and through the external agent 102 interacting with the container 204. The J0 motor assembly 305 actuates the rotor system through a driving gear which meshes with an involute gear profile to the driven gear on the slewing ring 304. A slip ring assembly 303 has a stator section which mounts to the base structure 306. The rotor section of the slip ring assembly 303 is linked to the J0 motor assembly 305. The slip ring assembly 303 continuously transfers electrical power and communications to the J0 motor assembly 305 from the rotor section to the stator section. This enables fully revolute motion about the vertical axis of J0. The agent mounting plate 302 is part of the stator system and connects with the base structure 306 to rigidly support an additional robotic system 301 above. The robot system 301 shown could be replaced with any off-the shelf or custom robotic system in addition to being a platform on which a human could stand to conduct tasks. The J0 hub outer covers 307 and 308 mate to the slewing ring 304 to provide ingress protection and a mounting pattern for the intermediate arm 202.

Figure 4:
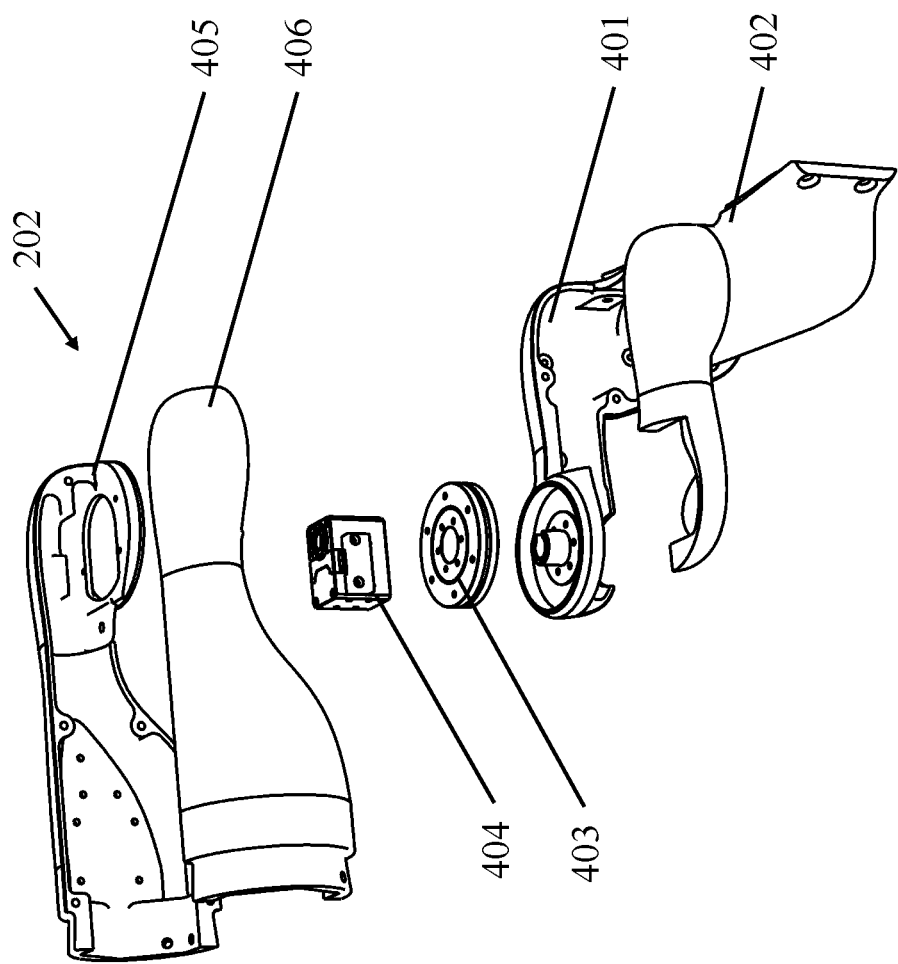
FIG. 4 shows an exemplary intermediate arm of the conveyance robot in accordance with one or more embodiments.

FIG. 4 details the components of subsystem 202, called the intermediate arm. The link 0 arm 401 mounts to the rotor section of the J0 Hub 201, namely the J0 hub outer covers 307 and 308. This link 0 arm 401 downstream end contains features to mount with the inner race of a face-mounted crossed-roller bearing 403. The bearing 403 serves to dynamically support the cantilever loading of all downstream components. The link 0 arm cover 402 is mounted to the link 0 arm to provide ingress protection. There is adequate space within link 0 to route electrical signals to power and control the joint one (J1) motor 404. The bearing 404 outer race is attached to the link 1 arm 405 which can rotate independently of link 0 and is driven by the J1 motor 404. The link 1 arm cover is mounted to the link 1 arm 405 to provide ingress protection. Additional DOFs, either prismatic or revolute, can be added or removed from this subassembly by adding more motors, arm links, arm link covers, and crossed-roller bearings, as desired.

Figure 5A:
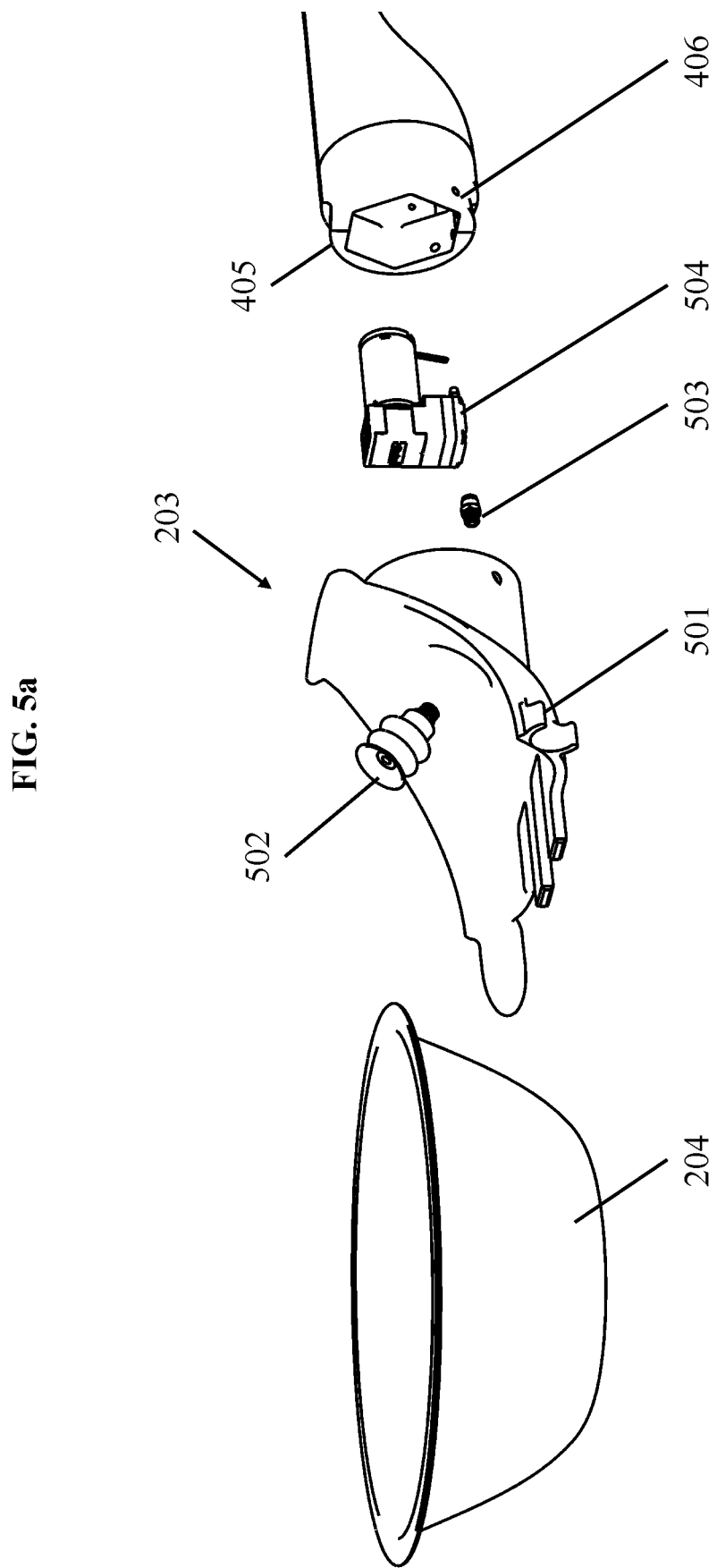
FIGS. 5a-5b show an exemplary end effector of the conveyance robot in accordance with one or more embodiments.

FIG. 5a shows subsystem 203 in an exploded view. The vacuum alignment hand 501 contains a vacuum cup 502 and an air fitting 503. The air fitting 503 is plumbed to vacuum pump 504 which is small enough to be packed internally of the link 1 arm 405 and cover 406. When vacuum is drawn through the pump 504, the vacuum cup 502 engages with the foodstuffs container 204 side wall in order to constrain tightly into the vacuum alignment hand 501.

Figure 5B:
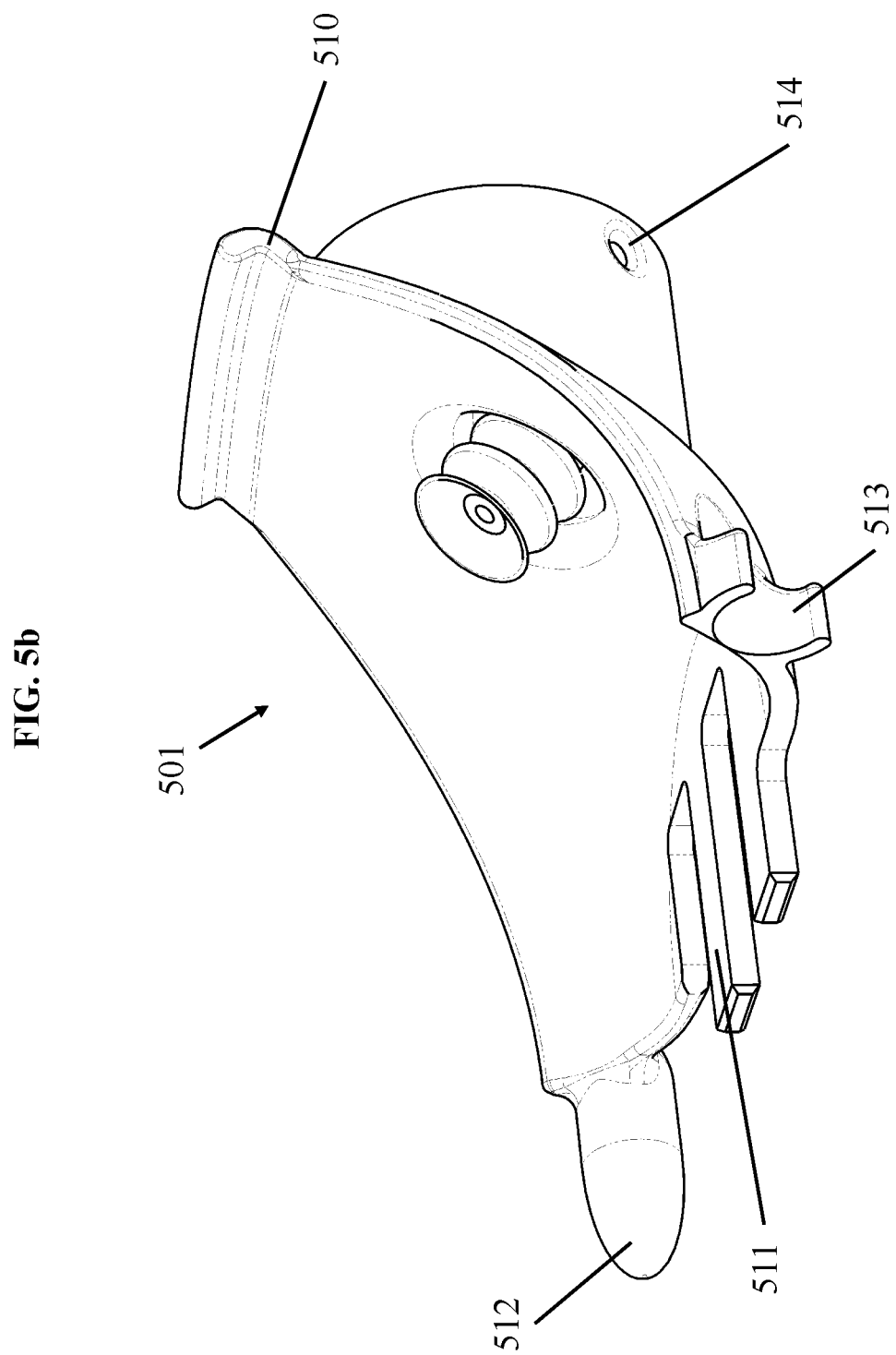

FIG. 5b shows details contained in the vacuum alignment hand 501 that assist in fully constraining round objects such as stainless steel mixing bowls 204. Feature 510 contains an internal edge that captures the bowl 204 outer rim. Feature 511 contains a flat section on which the bowl 204 can rest relative to gravity. Feature 511 also contains several fingers that extend past the bowl's center of gravity, reducing the likeliness that the bowl will tip off of the hand 501 once vacuum is released or in the event of system power loss. Feature 512 is a compliant, conically-shaped alignment pin and feature 512 is a hole that mates with pin feature 513. These features allow two misaligned hands 501 of the same design to mate consistently for container conveyance down an assembly line, such as is shown in FIG. 1b-d. These features could be configured to support separate bowl geometries. The hand is easily removable and replaceable through externally accessible mounting screw holes shown with feature 514.

Figure 6B:
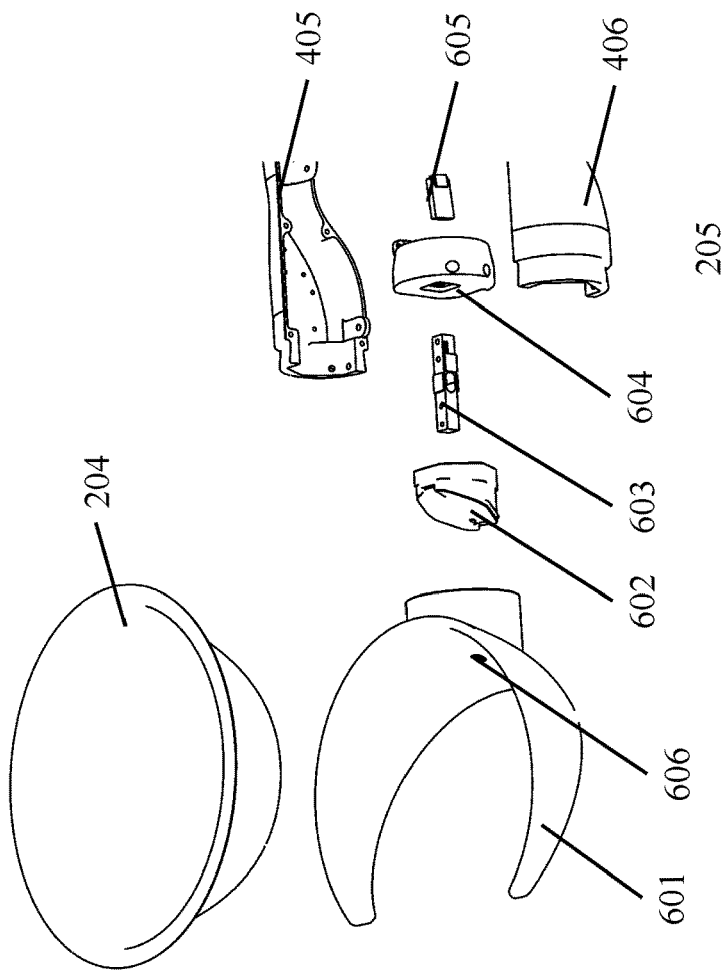
FIGS. 6a-6b show another exemplary end effector of the conveyance robot in accordance with one or more embodiments.
Figure 6A:
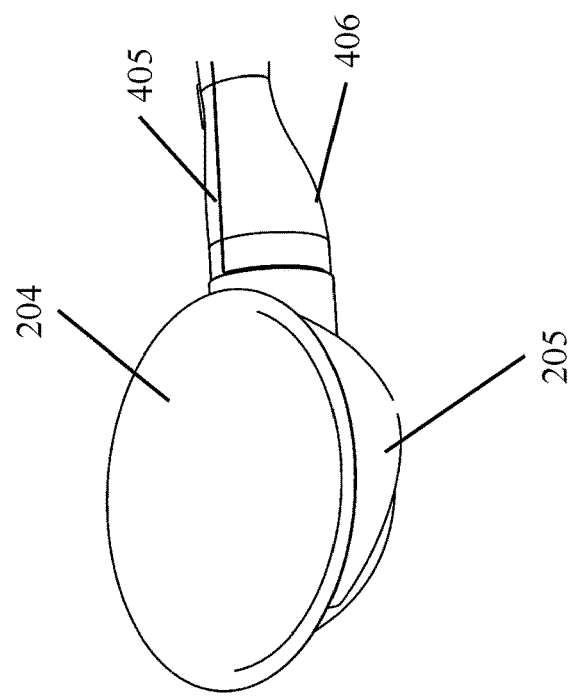

FIG. 6a details a separate helping hand design 205 that acts as a yoke to support the exterior surface of bowl 204. It is advantageous to support the bowl 204 in this fashion to keep the internal surfaces of the bowl 204 uncontaminated. The bucket ring 601 supports the bowl 204 from underneath the bowl's rim and contains wings that wrap around past the bowl's center plane to ensure the bowl will stay constrained as the robotic arm accelerates throughout the workspace. The bucket ring 601 does not wrap around the entirely of the bowl's exterior edge; the opening downstream in the bucket ring 601 is designed such that an external agent or mechanical fixture can easily remove the bowl 204 by lifting up and out.

FIG. 6b details an exploded view of subsystem 205. An upstream plug 604 is mounted to the inside of the intermediate arm link 1 arm 405 and cover 406. This plug mates with a bar load cell (a sensor that measures force) 603, which measures force oriented along a vertical axis, correlating to the gravity vector in the case shown and acting as a weight sensor for measuring the weight of the bowl or other item held by the robotic arm. The bar load cell connects with an electronics section 605, which contains the relevant componentry to convert and transfer data to the remainder of the system. The load cell 603 mates on the other end with the downstream plug 602. The downstream plug 602 contains features that provide mechanical overload protection for the load cell 603 if an external agent aggressively loads the bowl 204 or bucket ring 601 past an acceptable range. The downstream plug 602 also contains a single tapped hole that mates with the bucket ring 601 with one screw 606 such that it can be easily mounted, swapped, and replaced to accommodate different bowl geometries.

The end effector subsystems shown in FIGS. 5-6 contains features to prevent ingress protection through use of sealing materials and an arduous path that is formed at the interface of intermediate arm 405 and cover 406, and the vacuum alignment hand 501 or bucket ring 601. These features facilitate fluid movement to run off with respect to gravity only on cleanable exterior surfaces, or surfaces that are accessible by simple disassembly. No fluid should penetrate the device interior and damage the electronics within.

The external components in the robotic system intermediate arm and end effector subsystems as shown in FIGS. 3-6 could be easily swapped to improve performance in harsh environments. For example, in a hot environment, materials with improved thermal resistance could be used. Sensitive interior components could then be insulated, or the system could contain features to transferring heat away from sensitive areas. In a similar fashion, the robot could be retrofitted to function in environments that are cold, chemically toxic, etc.

Figure 7:
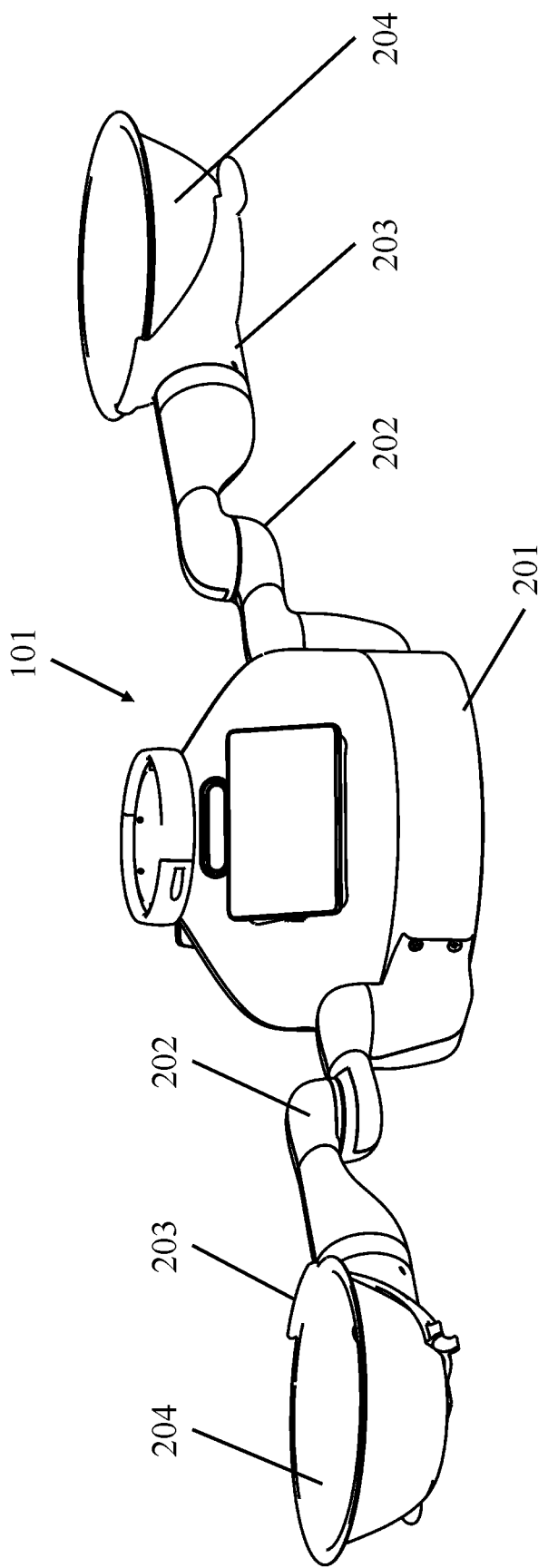
FIG. 7 shows an exemplary conveyance robot having two robotic arms in accordance with one or more embodiments.

FIG. 7 details an alternate configuration of assembly 101, with two arm subsystems comprising each of 202, 203, and 204. The two arm subsystems are attached 180 degrees apart from each other, on opposite sides of the J0 Hub 201. Any number of additional robotic arms could be appended in this fashion.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

The invention claimed is:

1. A robotic system for conveyance of items, comprising:
a hub assembly rotatable about a vertical axis;
a robotic arm having a first end and an opposite second end, said first end being connected to the hub assembly such that the robotic arm is fully revolute about the vertical axis;
an end effector connected to the second end of the robotic arm, said end effector configured for holding an item; and
wherein the hub assembly and the robotic arm are configured to restrict travel and operation of the end effector to only a horizontal plane around the vertical axis in every mode of operation of the end effector,
wherein the system is configured to support a robotic agent on or above the hub assembly for working on the item held by the robotic arm, said robotic agent having multiple degrees-of-freedom and configured to travel and operate in the entirety of a three-dimensional operating space extending around the robotic agent while the robotic agent is in place on or above the hub assembly
wherein operation of the robotic arm to move the item does not obstruct operation of the robotic agent, and the operation of the robotic agent does not obstruct the operation of the robotic arm.

2. The system of claim 1, wherein the item is a container, and wherein the robotic agent picks and places objects in the container.

3. The system of claim 1, wherein the robotic agent is rotatable about the vertical axis.

4. The system of claim 3, wherein the robotic arm is configured to shadow a robotic arm of said robotic agent as said robotic agent works on the item.

5. The system of claim 1, wherein the robotic arm is configured for operation in a harsh environment.

6. The system of claim 1, wherein the robotic arm includes ingress protection.

7. The system of claim 1, wherein the item is a container, and wherein the end effector is configured to manipulate a plurality of containers of different sizes.

8. The system of claim 1, further comprising one or more additional robot arms connected to the hub assembly for handling additional items.

9. The system of claim 1, wherein the item is a container, wherein the robotic arm shadows said robotic agent, and wherein said robotic agent picks and places food ingredients in the container.

10. The system of claim 1, wherein the robotic arm has one or more integrated sensors to collect given information about the item.

11. The system of claim 10, wherein the one or more integrated sensors include a load cell to measure the weight of the item.

12. The system of claim 1, wherein the end effector of the robotic system is configured to perform one or more tasks on the item in cooperation with the robotic agent or assist the robotic agent in performing one or more tasks on the item.

13. The system of claim 1, wherein the end effector includes a vacuum cup for holding the item.

14. A system, comprising:
a plurality of robotic systems, wherein each of said robotic systems comprises:
(a) a hub assembly rotatable about a vertical axis;
(b) a robotic arm having a first end and an opposite second end, said first end being connected to the hub assembly such that the robotic arm is fully revolute about the vertical axis;
(c) an end effector connected to the second end of the robotic arm, said end effector configured for holding an item, wherein the hub assembly and the robotic arm are configured to restrict travel and operation of the end effector to only a horizontal plane around the vertical axis in every mode of operation of the end effector; and
(d) a robotic agent on or above the hub assembly working on the item held by the robotic arm, said robotic agent having multiple degrees-of-freedom and configured to travel and operate in the entirety of a three-dimensional operating space extending around the robotic agent while the robotic agent is in place on or above the hub assembly, wherein operation of the robotic arm to move the item does not obstruct operation of the robotic agent, and the operation of the robotic agent does not obstruct the operation of the robotic arm;
wherein the robotic systems are configured to convey the item from the end effector of one robotic system to the end effector of an adjacent robotic system to be worked on by the robotic agent of the adjacent robotic system.

15. The system of claim 14, wherein the item is a container, wherein for each of said robotic systems, the robotic arm shadows the robotic agent, and robotic agent picks and places food ingredients in the container.

16. The system of claim 14, wherein in each robotic system, the robotic arm and the robotic agent are configured to cooperate to perform a two-handed operation on the item.

17. The system of claim 16, wherein each robotic system further comprises one or more additional end effectors, and wherein each robotic system is configured to automatically swap the end effector connected to the second end of the robotic arm with one of said one or more additional end effectors configured to perform the two-handed operation.

18. A method of performing operations on an item using a plurality of robotic systems, wherein each of the robotic systems comprises: (i) a hub assembly rotatable about a vertical axis; (ii) a robotic arm having a first end and an opposite second end, the first end being connected to the hub assembly such that the robotic arm is fully revolute about the vertical axis; (iii) an end effector connected to the second end of the robotic arm, wherein the hub assembly and the robotic arm are configured to restrict travel and operation of the end effector to only a horizontal plane around the vertical axis in every mode of operation of the end effector; and (iv) a robotic agent on or above the hub assembly, said robotic agent having multiple degrees-of-freedom and configured to travel and operate in the entirety of a three-dimensional operating space extending around the robotic agent while the robotic agent is in place on or above the hub assembly, wherein operation of the robotic arm and end effector to move the item does not obstruct operation of the robotic agent, and the operation of the robotic agent does not obstruct the operation of the robotic arm, wherein the method comprises the steps of:

(a) holding the item using the end effector of a first one of the robotic systems;

(b) performing an operation on the item using the robotic agent of the first one of the robotic systems or the robotic agent of an adjacent second one of the robotic systems while the item is being held by the end effector of the first one of the robotic systems;

(c) conveying the item using the robotic arm of the first one of the robotic systems to the end effector of the second one of the robotic systems; and (d) performing another operation on the item using the robotic agent of the second one of the robotic systems or the robotic agent of the first one of the robotic systems while the item is being held by the end effector of the second one of the robotic systems.

19. The method of claim 18, wherein the item comprises a container, and wherein performing the operation and the another operation comprises picking and placing foodstuff items in the container.

20. The method of claim 18, wherein in each robotic system, the robotic arm shadows the robotic agent.

21. The method of claim 18, further comprising automatically swapping the end effector of one of the robotic systems with another end effector suitable for performing a given operation on the item.

22. A method of performing operations on an item using a plurality of robotic systems, wherein each of the robotic systems comprises: (i) a hub assembly rotatable about a vertical axis; (ii) a robotic arm having a first end and an opposite second end, the first end being connected to the hub assembly; (iii) an end effector connected to the second end of the robotic arm; and (iv) a robotic agent on or above the hub assembly, wherein operation of the robotic arm and end effector to move the item does not obstruct operation of the robotic agent, wherein the method comprises the steps of:

(a) holding the item using the end effector of a first one of the robotic systems;

(b) performing an operation on the item using the robotic agent of the first one of the robotic systems or the robotic agent of an adjacent second one of the robotic systems while the item is being held by the end effector of the first one of the robotic systems;

(c) conveying the item using the robotic arm of the first one of the robotic systems to the end effector of the second one of the robotic systems;

(d) performing another operation on the item using the robotic agent of the second one of the robotic systems or the robotic agent of the first one of the robotic systems while the item is being held by the end effector of the second one of the robotic systems; and (e) automatically swapping the end effector of one of the robotic systems with another end effector suitable for performing a given operation on the item.

23. The method of claim 22, wherein the item comprises a container, and wherein performing the operation and the another operation comprises picking and placing foodstuff items in the container.

24. The method of claim 22, wherein in each robotic system, the robotic arm shadows the robotic agent.

* * * * *